UNITED STATES PATENT OFFICE.

HEINRICH EURICH, OF FRANKFORT-ON-THE-MAIN, GERMANY.

PROCESS OF MAKING POTASH SOAP.

SPECIFICATION forming part of Letters Patent No. 433,119, dated July 29, 1890.

Application filed October 25, 1889. Serial No. 328,182. (Specimens.)

*To all whom it may concern:*

Be it known that I, HEINRICH EURICH, a citizen of the Kingdom of Prussia, Germany, residing at Frankfort-on-the-Main, Prussia, have invented a new and useful Improvement in the Manufacture of Hard Potash Soap, of which the following is a specification.

My invention consists in the production of hard potash soaps from solid or liquid fats, from saponifiable resins, or from a mixture of the same with highly-concentrated solutions of caustic potash or melted potash, heat not below 100° centigrade being applied. I obtain these potash soaps in the following manner: I heat any saponifiable solid or liquid fat or resin, or a mixture of the same, to at least 100° centigrade. Thereupon I treat this fat or resin with a concentrated solution of potash not below 36° Baumé, or melted caustic potash or melted potash. These are poured into the mixture in a thin jet and while said mixture is thoroughly agitated or stirred.

The high temperature to which I heat my mixtures enables me to employ a highly-concentrated solution of caustic potash or equivalent substance, one having a specific gravity of at least 1.58, and at the same time obtain complete saponification. I am, moreover, enabled by the conjoint action of the high temperature and the highly-concentrated solution to complete the saponification in the short space of a half hour and to obtain a soap containing almost no water. The soap which my process yields also contains potash, caustic potash, and glycerine. I thus may obtain potash soaps of excellent qualities whose ingredients may vary considerably in proportions.

Like all other soaps, this hard potash soap may be mixed with the usual substitutes, such as water-glass or the like.

I claim—

In the art of making potash-soap, the improvement which consists in adding to a fat a strong solution of caustic potash and keeping the mixture at a high heat until a product is obtained which on cooling is a hard potash soap, substantially as described.

In testimony whereof I have signed this specification in the presence of two subscribing witnesses.

HEINRICH EURICH.

Witnesses:
   AUGUST B. DRANTZ,
   GUSTAV GROSS.